Feb. 3, 1959 A. F. DU FRESNE ET AL 2,872,564
WELDING APPARATUS
Filed July 26, 1954 3 Sheets-Sheet 1
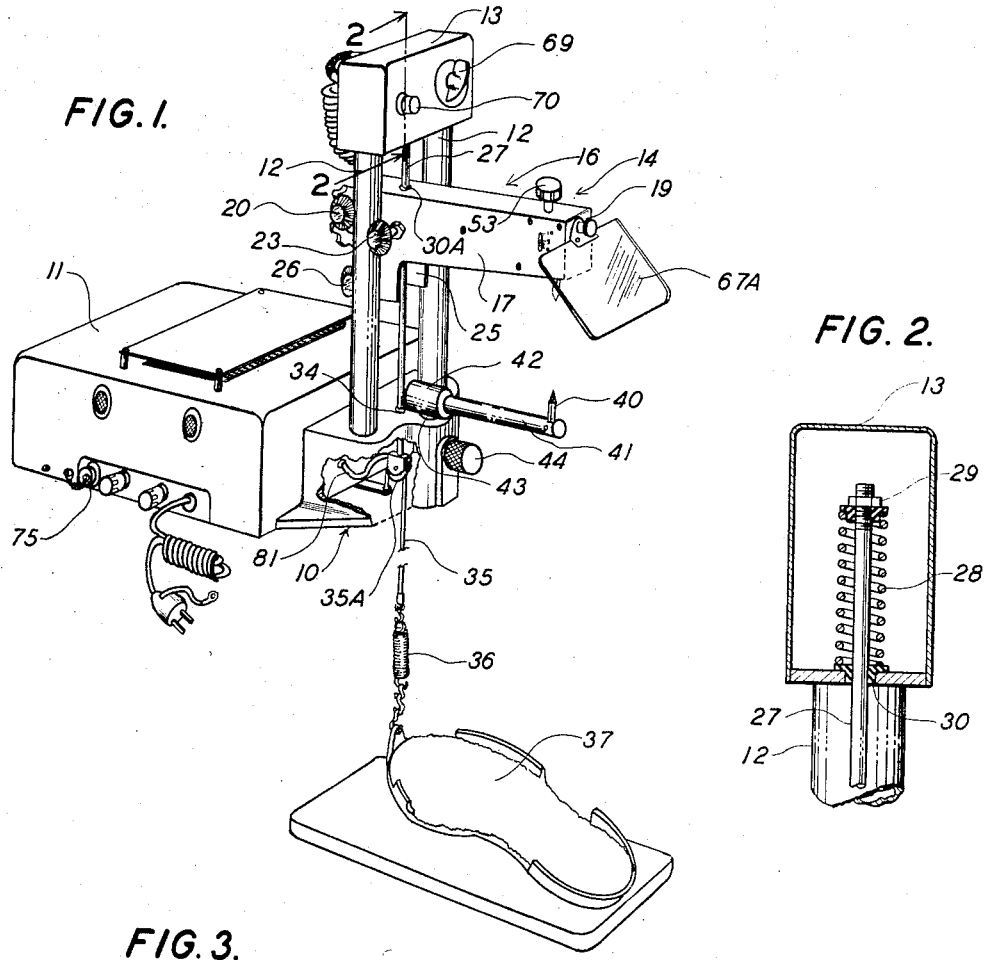
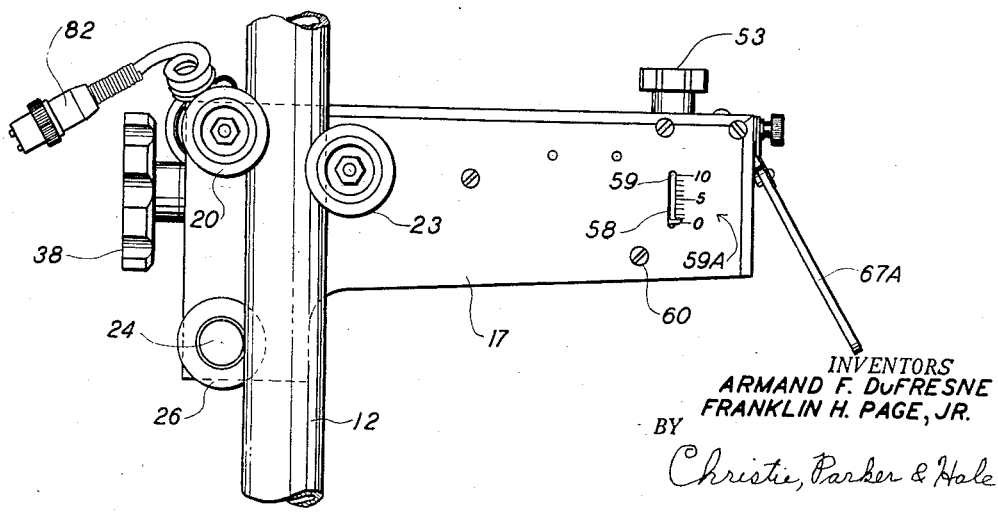
INVENTORS
ARMAND F. DuFRESNE
FRANKLIN H. PAGE, JR.
BY
Christie, Parker & Hale
ATTORNEYS Feb. 3, 1959  A. F. DU FRESNE ET AL  2,872,564
WELDING APPARATUS
Filed July 26, 1954  3 Sheets-Sheet 2

INVENTORS
ARMAND F. DuFRESNE
FRANKLIN H. PAGE, JR.
BY
Christie, Parker & Hale
ATTORNEYS Feb. 3, 1959        A. F. DU FRESNE ET AL        2,872,564
                       WELDING APPARATUS
Filed July 26, 1954                          3 Sheets-Sheet 3

INVENTORS.
ARMAND F. DuFRESNE
FRANKLIN H. PAGE, JR.
BY
Christie, Parker & Hale
ATTORNEYS United States Patent Office 2,872,564
Patented Feb. 3, 1959

2,872,564

WELDING APPARATUS

Armand F. Du Fresne and Franklin H. Page, Jr., Arcadia, Calif., assignors to Du Pa Co., Inc., Arcadia, Calif., a corporation of California Application July 26, 1954, Serial No. 445,876

13 Claims. (Cl. 219—86)

This invention relates to welding apparatus and more particularly to spot welding apparatus.

In conventional spot welding, two pieces of metal or "work" to be welded are held together and placed between two electrodes. Ordinarily the electrodes are vertically spaced and the lower electrode is stationary. The work is supported on its lower surface by the lower electrode and the upper electrode is forced down to contact the upper surface of the work. A large welding current is then caused to pass from one electrode to another through the metal pieces. The high contact resistance between the two pieces of metal coupled with high current density causes an increase in temperature of the two pieces in the vicinity of the electrode tips sufficient to cause the metal to become molten. This causes the two pieces to be fused together in a spot weld.

Depending on the nature and weight of metal being welded, the amount of current used and the force applied between the electrodes must be carefully selected in order to obtain a satisfactory weld. In some spot welders the welding current is caused to flow after the movable electrode has traveled a predetermined distance with respect to the stationary electrode. This system of spot welding depends upon accurate alignment and spacing of the electrode tips and is difficult to adjust readily when work of various thicknesses is to be welded. In addition, if the work or jig supporting the work is heavy, the lower electrode may be deflected from its normal position, causing the welding current to be passed before the upper electrode exerts proper welding force on the work. This results in welds which are of varying and unpredictable quality.

When the proper welding current is passed through the two pieces of metal, the metal-to-metal interface becomes molten over a small area for a brief interval and then cools to form the weld "nugget." In cooling, the nugget must be compressed very rapidly to insure a dense and ductile composition. This requires that the movable electrode be able to "follow-up" and forge the molten metal before it cools. The movable electrode in conventional spot welders has such a large amount of inertia that proper forging of the molten metal is not always obtained.

The present invention overcomes the above disadvantages by providing simple and inexpensive, yet rugged spot welding apparatus in which the firing of the welding current is independent of the thickness and weight of the work and is independent of the travel of one electrode with respect to the other. In addition, the movable electrode is mounted with a minimum amount of inertia to provide an efficient and reproducible forging action for each weld. These combined features make it possible to accomplish metal joining in welds which were formerly thought to be impractical, e. g., in the electronics, precision instruments and related manufacturing fields.

The present invention contemplates a spot welder in which a first electrode is supported in a substantially fixed position. A second electrode is mounted on a carrying head which is movable with respect to the first electrode. Means are provided for moving the head so that the two electrodes contact opposite sides of the work disposed between them, thereby causing a force to be exerted between the electrodes and actuate means operatively responsive to the force to control a circuit for supplying welding current to the electrodes.

In a presently preferred form of the invention, the second electrode is mounted on an arm pivotally carried by the movable head so that deflection of this arm with respect to the head actuates a microswitch which controls the circuit that supplies welding current to the electrodes. Means are provided for controlling the amount of relative movement required between the head and the arm to reset the switch. Adjustable springing means are also provided on the second electrode arm to permit adjustment of the force required between the two electrodes before the microswitch is actuated. Preferably, the second electrode arm is pivoted about a point lying in the plane which passes through the second electrode tip and is perpendicular to the direction of head movement.

The movable head is disposed between a pair of spaced, elongated stationary parallel members and a first set of wheels is attached to the head and adapted to ride on one side of the respective outer portions of the members. A second set of wheels is attached to the head and adapted to ride on the other side of the respective outer portions of the members so that the two sets of wheels cooperate to prevent movement of the head in any direction except that parallel to the members. For additional stability, a third set of wheels is attached to the head and the wheels are adapted to ride on the respective inner portions of the two members. The three sets of wheels are spaced from each other in a direction along the members and effectively cancel force components tending to move the members together or apart as the welder is operated.

Preferably the welding current is supplied to the electrodes from a bank of capacitors which have been charged to a predetermined voltage. The circuit which supplies the welding current comprises a first relatively slow-acting heavy current relay in series with a second relatively fast-acting relay. Both relays are operated by the microswitch and are connected in series to the capacitors. The capacitors are charged to a predetermined, but adjustable voltage by an electrical circuit comprising an electron tube adapted to be connected to a power source and having a plate, cathode, and control grid. The plate and cathode are connected in series with an impedance device and the capacitors; and means are provided for applying a fixed, but adjustable reference voltage to the control grid to establish the voltage to which the power source will charge the capacitor.

These and other aspects of the invention will be more clearly understood in the light of the following description taken in conjunction with the accompanying drawings in which:

Fig. 1 is a perspective view, partly broken away, of a preferred embodiment of the invention;

Fig. 2 is an enlarged sectional elevation taken on line 2—2 of Fig. 1;

Fig. 3 is a side elevation of the movable head of the apparatus shown in Fig. 1;

Figure 4:
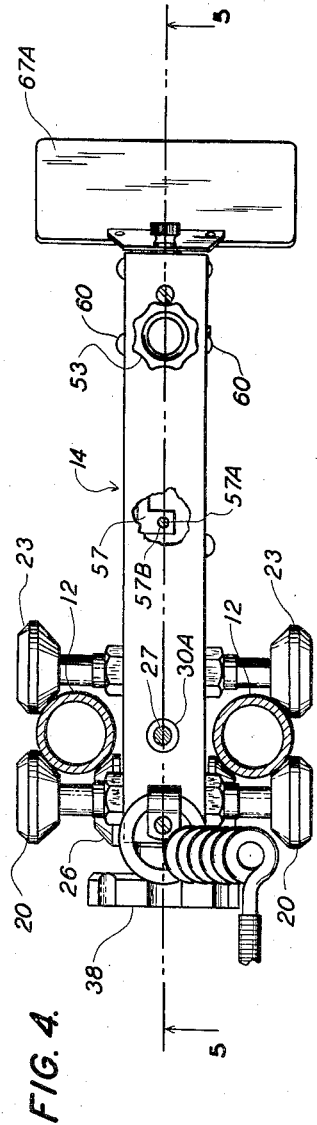
Fig. 4 is a top view, partly broken away, of the movable head shown in Fig. 2.

Referring to Figs. 1 through 5, the spot welder comprises a hollow base or column support 10 adapted to be mounted at any convenient height on a table, work bench, etc. A power supply box 11 is attached to the rear of the base. A pair of laterally-spaced, upwardly-extending elongated members or columns 12 are attached at their lower ends to the base. A rectangularly-shaped control box 13 is mounted across the upper ends of the columns. A hollow-rectangularly-shaped head 14 is disposed between the two columns and extends forward of the base in a direction substantially perpendicular to the plane defined by the two columns. The head has a top wall 15, a right side wall 16, a left side wall 17, a front end wall 19, and is open at its bottom. The head is movably supported at its rear end by a first pair of wheels 20 rotatably mounted on the ends of a horizontal guide shaft 21, which is journalled through the upper part of the head side walls to the rear of the columns. The wheels are tapered to a reduced thickness at their peripheries and their inner edges are adapted to make a close, rolling contact with the outer rear portion of the nearest respective column. A second guide shaft 22, located slightly below the first guide shaft and in front of the two columns, extends horizontally through the head and parallel to the first shaft. A second pair of guide wheels 23 is mounted on the ends of the second guide shaft. These wheels are also tapered and their inner edges bear against the forward outer portion of the nearest respective column. A third guide shaft 24, located directly below the first guide shaft, is journalled horizontally through a downwardly-extending projection 25 attached to the rear part of each head side wall. A pair of tapered wheels 26 are mounted on the ends of the third guide shaft and adapted to ride against the inner rear portion of the nearest respective column. The three sets of wheels minimize any tendency for the head to pivot about a horizontal or vertical axis so that accurate vertical linear motion is obtained as the head is moved. Also the "inboard" and "outboard" arrangement of the wheels effectively cancels the force components tending to move the columns apart or together as the welder is operated. The wheels are of suitable insulating material, such as Bakelite plastic.

The head is also supported by a pull rod 27 extensibly suspended at its upper end in the control box by a compression spring 28 disposed around the upper end of the rod (see Fig. 2). A nut 29 is threaded onto the end of the rod so that the spring is compressed between the nut and the bottom of the control box. The lower end of the spring rests on a first insulating sleeve 30 in the bottom of the control box so that the pull rod is electrically insulated from the spot welder control box. The pull rod extends down through the insulating sleeve in the bottom of the control box and through a second insulating sleeve 30A in the top wall of the head, through a vertical bore 31 in a head-locking shaft 32 which extends horizontally through an insulating block 33 mounted in the rear of the head, and through a third insulating sleeve 34 centered between the two columns in the base. One end of a cable 35 is attached to the interior of the base and extends over a pulley 35A which is attached to the lower end of the pull rod. The cable extends down to a hook-spring arrangement 36, which is attached to the forward end of a conventional foot pedal 37 to prevent mechanical overloading of the welder.

A head-locking knob 38 made of insulating material and having an internally-threaded shoulder 39 is threaded onto the rear end of the head-locking shaft so that the shoulder bears against the rear of the insulating block. The head is locked to the pull rod by turning the head-locking knob to cause the locking shaft to be pulled in a rearward direction. This forces the pull rod against the insulating block which is made of a suitable insulating material such as a phenolic resin. Thus, the head is supported by the pull rod and is guided to move in a vertical direction by the guide wheels.

An upwardly extending lower or first electrode 40 is carried at the forward end of a horizontal lower electrode arm 41 attached at its rear end to the base by a support 42 which extends down into a vertical bore 43 provided through the central forward portion of the base. A threaded lower locking knob 44 extends horizontally through the base and serves to lock the lower electrode in any desired position.

Figure 5:
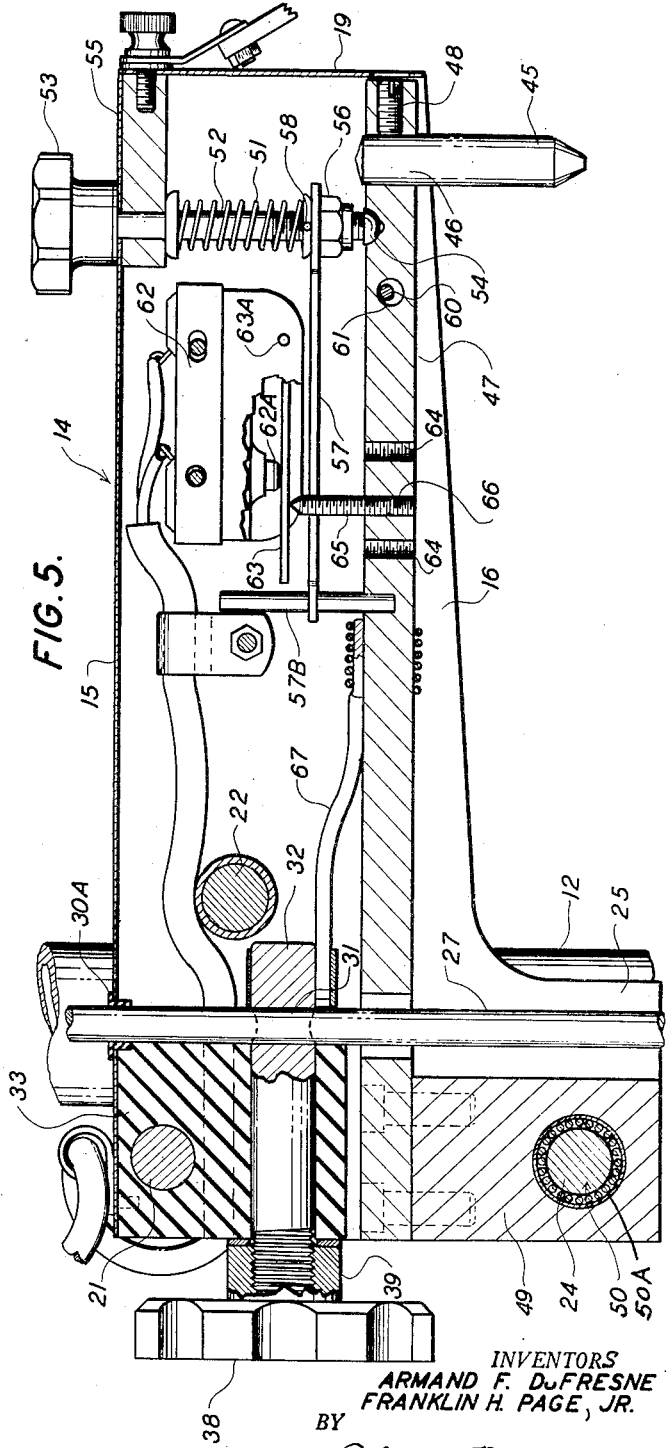
Fig. 5 is an enlarged view taken on line 5—5 of Fig. 4.

Referring to Fig. 5, an upper or second electrode 45 is supported in a vertical bore 46 at the forward end of a horizontal upper electrode arm 47. The upper electrode is adjustably held in its bore by a horizontal set screw 48 threaded into the bore through the upper arm. The rear end of the upper electrode arm is provided with a downwardly-extending projection 49 which is pivoted at 50 about the central part of the third guide shaft on a needle bearing 50A, so that the upper arm can move in a vertical plane with minimum friction. The upper electrode is set so that its lower tip is in the horizontal plane passing through the pivot point of the upper arm, i. e., in the plane which is perpendicular to the direction of head movement and which passes through the pivot point. With this arrangement, there is a minimum amount of "wiping" or relative motion of the electrode tips during the pressure and welding cycles. This permits welding of small and delicate components and prevents the rolling of wire or other curved components which are to be welded.

The outer end of the upper electrode arm is urged in a downward direction by a vertical compression spring 51 coaxially disposed about a threaded pressure-regulating shaft 52. The pressure-regulating knob 53 is attached to the upper end of the shaft which extends through the top wall of the head. The lower end of the shaft seats in a recess 54 provided in the upper electrode arm. The spring is confined between a fixed block 55 in the upper part of the head and a nut 56 on the lower end of the pressure-regulating shaft. The nut is rigidly attached to one end of an elongated horizontal blade 57 and is restrained from rotation because the other end of the plate is provided with a hole 57A which slides on an upright post 57B on the upper arm and spaced inwardly from the recess. Thus, when the pressure-regulating shaft is rotated by means of a knob 53, the nut travels up or down the shaft, depending on the direction of shaft rotation. This varies the amount of pre-loaded force applied to the outer end of the upper arm. A horizontal indicator 58 extends from the movable nut to a vertical slot 59 provided in the side wall 17 of the head. An arbitrary scale 59A adjacent the vertical slot is provided on the outside of the wall to indicate the pre-loaded force exerted on the upper arm by the spring. A stop pin 60 extends from the left side wall of the head through a horizontal bore 61 in the upper electrode arm and through the right side wall. The bore is sufficiently large to allow the upper arm a limited amount of movement in a vertical direction.

Preferably the upper electrode arm is made of lightweight metal in order to provide an arm of low inertia so that the spring loading of the arm will cause it to force the electrode downwardly instantly as the metal of the work becomes molten. This action is important to provide proper forging of the molten metal in order to obtain a strong weld. We have found that a 24S–T4 aluminum alloy (93.4% Al, 4–5% Cu, 6% Mn, 1.5% Mg) which has been copper-plated, is well suited for construction of the upper electrode arm because it has the three following advantages: (1) It is lightweight and therefore provides an arm of low inertia; (2) aluminum and its alloys have a low specific resistance which is desirable for the conduction of high currents used in spot welding; (3) aluminum which has heretofore been unsatisfactory for this purpose due to its high surface and contact resistance is well suited when provided with a copper plating. Other lightweight alloys can also be employed; for example, magnesium and its alloys may be used satisfactorily. Any of the lightweight alloys so used which tend to form surface films of high resistance should be plated with a suitable material; e. g. copper, which forms a protective, low-resistance coating. The terms "lightweight metal" and "lightweight metal alloys" are used to include those materials of relatively low specific gravity, as compared to metals which are normally used in welding equipment. For example, iron and copper, which are normally used, have specific gravities of about 8, while the magnesium and aluminum alloys have specific gravities ranging from about 1.7 to 3.0. The lightweight materials as included in this invention should have a resistivity of about that of magnesium (e. g. 5 micro-ohm-cm.) or less.

A firing switch 62, preferably a microswitch with a contact button 62A, is attached to the inner surface of the left side wall of the head just to the rear of the pressure-regulating shaft. One end of a rearwardly-extending lever arm 63 is pivotally attached at 63A to the forward part of the microswitch. The lever arm overlies three spaced threaded vertical bores 64 in the upper electrode arm. A first screw 65 is threaded into the middle bore and a second set screw 66 is threaded into the lower portion of the middle bore and serves to lock the first set screw. The set screws may be placed in any of the bores to provide the desired amount of travel of the upper electrode arm with respect to the head to reset the switch. For most welding operations this travel should be about .020 inch. The firing switch is connected to the electric circuit as shown schematically in Fig. 6, and its operation is described below.

One end of a heavy, flexible conductor 67 is electrically connected to an intermediate portion of the upper arm and the other end of the conductor is attached to the forward end of the locking shaft. This permits the pull rod and locking shaft to serve as a conductor for part of the welding circuit, as described in detail below in connection with Fig. 6.

A transparent visor shield 67A is attached to the forward end of the head and extends outwardly and downwardly toward the upper electrode. The visor is made of a heavy transparent material such as glass or plastic and serves to protect the operator during the welding process.

Figure 6:
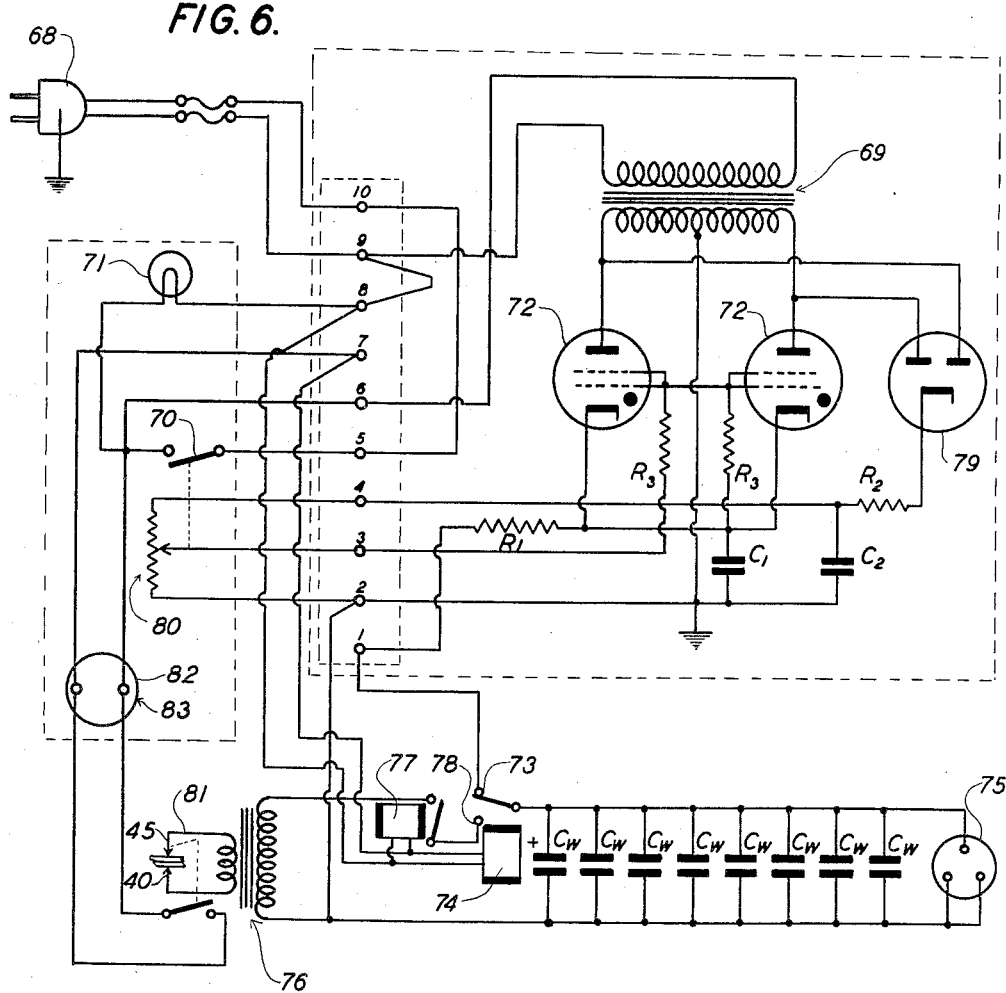
Fig. 6 is a schematic circuit diagram of the apparatus of Figs. 1 through 5.

Referring now to Fig. 6, which shows schematically the components of the welding circuit, most of which are located in the power supply box, a conventional three-conductor plug 68 adapted to be connected to a power source (not shown) supplies electrical power to the primary winding of a power supply transformer 69 through a main control switch 70. The main switch also operates a pilot light 71 which indicates when power is supplied to the welding circuit. The secondary winding of the power supply transformer is center-tapped to earth ground through the ground lead of the plug, and has each of its ends attached respectively to the plates of two thyratron tubes 72. The cathode of each thyratron is connected through a stabilizing capacitor $C_1$ to ground and is also connected through a resistance $R_1$ to a first contact 73 of a relatively quick-acting, double-throw relay 74. The relay armature (normally closed against contact 73) is connected to the positive side of eight welding capacitors $C_w$ connected in parallel. A voltmeter jack 75 is connected across the welding capacitors to permit ready access for checking the voltage stored by the capacitors. The negative side of the capacitors are connected to one end of the primary coil of a welding transformer 76. The other end of the welding transformer primary coil is connected to one contact point of a relatively slow-acting heavy current relay 77, e. g., a mercury plunger-type relay. The slow-acting relay is normally in an open position and its other contact is connected in series with a second contact 78 of the quick-acting relay. The term "quick-acting" and "slow-acting" are used to indicate the relative values of the actuation times of the two relays, i. e., the time required for the relays to open or close after an energizing signal is applied to their coils.

The two plates of a rectifier tube 79 are respectively connected to the opposite ends of the secondary winding of the power transformer. The cathode of the rectifier tube is connected through a smoothing component comprising a capacitor $C_2$ and resistance $R_2$ and through a potentiometer 80, the movable arm of which is connected to apply a fixed, but adjustable reference voltage to the control grids of the thyratrons. The rectifier tube is operated at a reduced heater voltage to provide a necessary time delay to protect the thyratron cathode surfaces when the main control switch is turned on. Resistors $R_3$ are respectively provided in the grid circuits of each of the thyratrons to protect the grids. For convenience, the various conventional filament power supply components are not shown.

As shown in Figs. 1 and 6, the upper electrode is connected to one end of the secondary winding of the welding transformer (using the pull rod and a flexible conductor 81 connected to the lower end of the pull rod as part of the circuit), and the lower electrode is connected to the other end of the secondary winding. The upper electrode is arranged to control the microswitch which is connected to a plug 82 adapted to fit into a jack 83 connected to the relay coils. The lower electrode is connected to the other end of the secondary winding of the welding transformer.

The following table gives the values of the resistors and capacitors used in the circuit shown in Fig. 5 where the transformer 69 supplies 750 volts R. M. S., center-tapped, and a maximum of 450 volts D. C. is desired in the welding capacitor:

Capacitors: Mfd.
$C_1$ ---------------------------------------------------- .25
$C_2$ ---------------------------------------------------- .01
$C_w$ ----------------------------------------------each__ 100

Resistances: Ohms
$R_1$ ---------------------------------------------------- 150
$R_2$ ---------------------------------------------------- 51K
$R_3$ ---------------------------------------------------- 470K The circuit operates to store the desired amount of energy in the welding capacitors as follows:

The main control switch is turned on and the circuit is allowed to warm up for about 30 seconds. This switch is ganged with the adjustable arm of the potentiometer so that the main control switch must be turned on before the potentiometer can be adjusted to any desired value. The potentiometer control is then set to the desired value, depending on the type of material to be welded. This imposes a fixed reference voltage with respect to the negative side of the welding capacitors on the grids of the two thyratrons. Since the plates of the thyratrons are connected to an alternating source of power, they are alternately conducting and non-conducting to supply a charge through the cathodes and resistor $R_1$ to the welding capacitors. The welding capacitors become charged to a voltage slightly higher than the reference voltage applied to the thyratron grids. This slight difference in voltage is sufficient to apply a bias voltage between the thyratron grids and cathodes to prevent firing of the thyratrons. If the voltage tends to drop on the capacitors, the voltage difference between the plate-cathode of each thyratron becomes sufficient to overcome the grid bias and the tubes conduct until the capacitor voltage is brought up to the desired value. The resistor $R_1$ in series with the thyratrons and the welding capacitors during the welding operation, stabilizes the charging rate of the capacitors when relatively low voltage is to be stored, e. g., 20 volts, and permits reproducible welding currents of low values to be obtained. The resistance, or other impedance, such as inductance, may be in either the plate or cathode circuit of the thyratrons but better results have been obtained using the latter arrangement.

A weld is made with the apparatus as follows: The pressure on the upper electrode arm is set to a predetermined value by adjustment of the spring compression with the pressure-regulator knob. The head is adjusted by means of the head-locking knob to the proper position on the pull rod so that the work to be welded can be easily slipped in between the two electrodes, but is set close enough to the work so that the head does not need to move more than about one inch to effect the weld. With the work held in position between the two electrodes, pressure is applied to the foot pedal, causing the pull rod to move down. This carries the head and the upper electrode arm down so that the upper electrode contacts the work. As the head continues to move down, the upper arm pivots upwardly with respect to the head against the force exerted by the spring, causing the set screw 62 to actuate the firing switch. The three sets of wheels on the head ensure accurate, vertical movement of the head while applying pressure to the upper electrode arm.

Referring to Fig. 6, when the two coils of the slow and fast-acting relays are energized by actuation of the microswitch, the quick-acting relay reacts first to connect the positive side of the welding capacitors to the contact of the slow-acting relay. A short time later the slow-acting relay closes to connect the welding capacitors across the primary coil of the welding transformer, and cause a large but controlled surge of current through the welding transformer secondary, the electrodes, and the work which becomes molten at the point of electrode contact. Due to the low inertia of the upper arm, the pressure spring immediately forces the upper electrode down onto the molten metal to give a proper forging action, and the lever across the microswitch control button prevents premature resetting of the microswitch as the arm moves away from the head during the forging action. This prevents "double-firing" of the welder on a single weld. Preferably the fast-acting relay operates to close in the matter of four or five microseconds and the slower-acting mercury relay operates to close in 10 to 12 microseconds. Thus, the operation of the relays is almost instantaneous; yet the mercury plunger relay, which is capable of conducting large currents without any pitting or welding of relay contacts, actually makes the circuit to conduct the large current. In addition, the mercury relay is considerably cheaper than other elements, e. g., thyratron tubes, which are normally used in welding circuits for making contact to conduct the welding current.

After the weld is completed, pressure is removed from the foot pedal and the microswitch opens and resets for another operation. On the opening of the microswitch, the two relays fall back into their original positions and the charging of the welding capacitors proceeds as described above.

The welder is fired only by the application of a predetermined welding force to the upper electrode, and is unaffected by the weight of the work or by the weight of any jigs which might be used to hold the work. No additional firing control is necessary because the welder fires automatically as soon as the proper force is reached. The firing pressure is also independent of the electrode or head adjustments, because the firing switch is actuated only by the deflection of the arm with respect to the head after the upper electrode has contacted the work. Also, by using the movement of the upper electrode arm to actuate the welding circuit, the pull rod can be used to serve three functions, namely: (1) As a conductor for part of the welding circuit; (2) As actuating means for operating the movable head; and (3) As supporting means for the adjustable head. This permits compact and simple construction of the welder. A welder constructed in accordance with this invention has versatility which extends over a wide range of materials and thicknesses. Equally satisfactory results have been achieved with work ranging from the fusing of two 0.0008" diameter wires, up to two sheets of 20-gauge mild steel. The low inertia upper arm permits successful welds on copper and other materials generally considered impractical for spot welding. For example, tungsten-to-tungsten welds which, so far as is known, have not been practical, are readily performed with the above described welder.

Obvious modifications employing the principle of this invention may be used to achieve equivalent results. For example the electrode carried by the movable head may be mounted rigidly thereto, and the other electrode may be displaceably mounted on its support so the displacement of the "stationary" electrode is used to actuate the welder.

We claim:

1. In a spot welder, the combination comprising a first electrode, a carrying head movable with respect to the first electrode, a second electrode displaceably mounted on the head, means for moving the head so that the two electrodes contact opposite sides of a piece of work disposed between them and the second electrode is displaced with respect to the head, a circuit for supplying current to the electrodes, and means operatively responsive to the displacement of the second electrode for controlling the circuit.

2. In apparatus for spot welding a piece of work, the combination comprising a first electrode, a carrying head movable with respect to the first electrode, a second electrode displaceably mounted on the head, means for moving the head with respect to the first electrode so that the two electrodes contact opposite sides of the work at a common point and the second electrode is displaced with respect to the head, a circuit for supplying current to the electrodes, and a switch operatively responsive to the displacement of the second electrode for controlling the circuit.

3. Apparatus according to claim 2 in which the switch is closed when the relative movement between the second electrode and the head is in one direction and the switch is opened and reset when the said relative movement is in the opposite direction and which includes adjustable means for setting the amount of said relative movement required for resetting the switch.

4. Apparatus according to claim 2 in which the switch is a microswitch having a control button and the apparatus includes a lever having one end pivotally attached with respect to the head and extending adjacent the control button so that the microswitch is operated as the lever is pivoted, and adjustable means for moving the lever as the head is moved with respect to the second electrode.

5. In apparatus for spot welding a piece of work, the combination comprising a first electrode, a carrying head movable with respect to the first electrode, an electrode arm pivotally mounted on the head, springing means for urging the arm toward the first electrode, a second electrode mounted on the electrode arm and spaced from the pivot, means for moving the head with respect to the first electrode so that the two electrodes contact opposite sides of the work at a common point and the second electrode is deflected with respect to the head, a circuit for supplying current to the electrodes, and a switch operatively responsive to the deflection of the second electrode for controlling the circuit.

6. Apparatus according to claim 5 which includes adjusting means for controlling the force exerted by the spring on the arm and means for limiting the movement of the arm with respect to the head.

7. In apparatus for spot welding a piece of work, the combination comprising a first electrode, a carrying head movable with respect to the first electrode, an electrode arm pivotally mounted on the head, a second electrode mounted on the electrode arm and spaced from the pivot, means for moving the head with respect to the first electrode so that the two electrodes contact opposite sides of the work at a common point and the second electrode is deflected with respect to the head, a circuit for supplying current to the electrodes, and a switch operatively responsive to the deflection of the second electrode for controlling the circuit.

8. In apparatus for spot welding a piece of work, the combination comprising a first electrode, a carrying head movable with respect to the first electrode, an electrode arm pivotally mounted on the head, a second electrode mounted on the electrode arm and spaced from the pivot with its free end in the plane which passes through the arm pivot and is substantially perpendicular to the direction in which the head is movable, means for moving the head with respect to the first electrode so that the two electrodes contact opposite sides of the work at a common point and the second electrode is deflected with respect to the head, a circuit for supplying current to the electrodes, and a switch operatively responsive to the deflection of the second electrode for controlling the circuit.

9. In apparatus for spot welding a piece of work, the combination comprising a pair of spaced, elongated, stationary, parallel members, a first electrode disposed between the members, a forwardly extending head movable with respect to the first electrode disposed between the two members, a first shaft attached to the head and extending across the rear side of the members, a wheel mounted on each end of the first shaft to ride on the outside rear portion of the nearest member, respectively, a second shaft attached to the head and extending across the forward side of the members, and a wheel mounted on each end of the second shaft to ride on the outside forward portion of the nearest member, respectively, an electrode arm pivotally mounted on the head, a second electrode mounted on the electrode arm and spaced from the pivot, means for moving the head with respect to the first electrode so that the two electrodes contact opposite sides of the work at a common point and the second electrode is deflected with respect to the head, a circuit for supplying current to the electrodes, and a switch operatively responsive to the deflection of the second electrode for controlling the circuit.

10. In apparatus for spot welding a piece of work the combination comprising a pair of spaced, elongated, stationary, parallel members, a first electrode disposed between the members, a forwardly extending head movable with respect to the first electrode and disposed between the two members, a first shaft attached to the head and extending across the rear side of the members, a wheel mounted on each end of the first shaft to ride on the outside rear portion of the nearest member, respectively, a second shaft attached to the head and extending across the forward side of the members, and a wheel mounted on each end of the second shaft to ride on the outside forward portion of the nearest member, respectively, a third shaft attached to the head and extending across the rear side of the members, and a wheel mounted on each end of the shaft to ride on the inside rear portion of the nearest member, respectively, an electrode arm pivotally mounted on the head about the third shaft, a second electrode mounted on the electrode arm and spaced from the pivot, means for moving the head with respect to the first electrode so that the two electrodes contact opposite sides of the work at a common point and the second electrode is deflected with respect to the head, a circuit for supplying current to the electrodes and a switch operatively responsive to the deflection of the second electrode for controlling the circuit.

11. In apparatus for spot welding a piece of work, the combination comprising a first electrode, a carrying head movable with respect to the first electrode, an electrode arm made of a relatively light metal alloy pivotally mounted on the head, a second electrode mounted on the electrode arm and spaced from the pivot, means for moving the head with respect to the first electrode so that the two electrodes contact opposite sides of the work at a common point and the second electrode is deflected with respect to the head, a circuit for supplying current to the electrodes, and a switch operatively responsive to the deflection of the second electrode for controlling the circuit.

12. In apparatus for spot welding a piece of work, the combination comprising a first electrode, a pair of laterally-spaced, stationary, elongated, parallel members, a pull rod disposed between the members and attached at one end to the members for limited movement in a direction parallel to the members, a carrying head adjustably attached to the pull rod, an electrode arm pivotally mounted on the head, a second electrode electrically connected to the pull rod and mounted on the electrode arm remote from the pivot, means for moving the pull rod with respect to the first electrode so that the two electrodes contact opposite sides of the work at a common point and the second electrode is deflected with respect to the head, a circuit for supplying current to the electrodes through the pull rod, and a switch operatively responsive to the deflection of the second electrode for controlling the circuit.

13. In a spot welder, the combination comprising a first electrode, a support member, a second electrode mounted on the support to be displaceable with respect to the support, means for effecting relative movement between the two electrodes so that they contact opposite sides of a piece of work disposed between them and the second electrode is displaced with respect to the support, a circuit for supplying current to the electrodes, and means operatively responsive to the displacement of the second electrode for controlling the circuit.

References Cited in the file of this patent

UNITED STATES PATENTS

| Number | Name | Date |
|---|---|---|
| 1,796,009 | Dunn | Mar. 10, 1931 |
| 1,967,094 | Lincoln | July 17, 1934 |
| 1,988,537 | Breguet | Jan. 22, 1935 |
| 2,037,040 | Paugh | Apr. 14, 1936 |
| 2,314,099 | Mikhalapov | Mar. 16, 1943 |
| 2,314,882 | Hensel et al. | Mar. 30, 1945 |
| 2,401,528 | Vang | June 4, 1946 |
| 2,472,368 | Cox | June 7, 1949 |
| 2,479,053 | Adams | Aug. 16, 1949 |
| 2,521,471 | May | Sept. 5, 1950 |
| 2,593,504 | Varela | Apr. 22, 1952 |
| 2,617,086 | Willemse | Nov. 4, 1952 |
| 2,679,437 | Pusztay | May 25, 1954 |
| 2,688,065 | Clark | Aug. 31, 1954 |
| 2,689,295 | Goldner | Sept. 14, 1954 |
| 2,695,821 | Crumling | Nov. 30, 1954 |
| 2,752,302 | Maganus | June 26, 1956 |